(12) United States Patent
Colliar et al.

(10) Patent No.: US 6,598,935 B2
(45) Date of Patent: Jul. 29, 2003

(54) VEHICLE SEAT

(75) Inventors: James Colliar, Billericay (GB); Jeffrey W. Mowatt, Billericay (GB); Russell W. Strong, Craftsbury Common, VT (US); Michael Skelcher, Latchingdon (GB)

(73) Assignee: New Holland North America, Inc., New Holland, PA (US)

( * ) Notice: Subject to any disclaimer, the term of this patent is extended or adjusted under 35 U.S.C. 154(b) by 10 days.

(21) Appl. No.: 09/952,528

(22) Filed: Sep. 14, 2001

(65) Prior Publication Data

US 2002/0084679 A1 Jul. 4, 2002

(30) Foreign Application Priority Data

Sep. 15, 2000 (GB) .............................................. 0022609

(51) Int. Cl.[7] .............................................. A47C 31/00
(52) U.S. Cl. .................................. 297/183.9; 297/217.1
(58) Field of Search ........................... 297/183.9, 217.1, 297/162, 183.4, 463.1, 463.2, 367; 248/291.1, 284.1

(56) References Cited

U.S. PATENT DOCUMENTS

| 4,057,122 A | * | 11/1977 | Brownell et al. |
| 4,598,944 A | * | 7/1986 | Meyer et al. |
| 4,653,807 A | * | 3/1987 | Hirose et al. |
| D353,460 S | * | 12/1994 | Reynolds et al. |
| 5,542,690 A | * | 8/1996 | Kozicki |
| 6,176,335 B1 | * | 1/2001 | Schaffner et al. |
| 6,192,665 B1 | * | 2/2001 | Asselin et al. |
| 6,202,501 B1 | * | 3/2001 | Ikari |
| 6,347,999 B1 | * | 2/2002 | Yuan |
| 6,425,450 B1 | * | 7/2002 | Lansberry |
| 6,446,758 B1 | * | 9/2002 | Schatz |
| 6,470,874 B1 | * | 10/2002 | Mertes |
| 6,488,504 B1 | * | 12/2002 | Patterson |

FOREIGN PATENT DOCUMENTS

EP 1188866 * 3/2002

* cited by examiner

*Primary Examiner*—Peter M. Cuomo
*Assistant Examiner*—Stephen Vu
(74) *Attorney, Agent, or Firm*—John William Stader; Rebecca L. Henkel

(57) ABSTRACT

A vehicle seat for an operator is disclosed in combination with a mechanical joystick for operating ancillary equipment of the vehicle. The joystick is pivotably mounted on the seat for movement between an active position in which the joystick may be manipulated by a seated operator and a stowed position in which access to the seat is unencumbered by the joystick.

11 Claims, 2 Drawing Sheets

VEHICLE SEAT

BACKGROUND OF THE INVENTION

The present invention relates to a vehicle seat and is particularly applicable to the seat of an agricultural vehicle, such as a tractor.

Tractor operators sometimes use a joystick to control the position of an implement or ancillary equipment mounted on the tractors. The operator may need to move or swivel the seat while using the joystick, for example to keep sight of the implement being manipulated using the joystick, and for this reason it is convenient to mount the joystick on the seat so that it moves with the seat and always remains within easy reach of the operator.

Joysticks are known that operate electronically, these being in principle similar to the joystick used in playing computer games. Such joysticks are only required to move the tappings of two potentiometers and they can therefore be constructed as small units that are easily mounted on a seat. Furthermore, the wires leading to the potentiometers of such joysticks can readily be mounted neatly in the cab of the tractor.

The disadvantage of such joysticks is that they can only be used in conjunction with a complex and costly electronic implement control system which must additionally comprise such items as servo-motors, position sensors and a control circuit.

A more simple solution to allow remote control of the position of an implement is to use a mechanical joystick. Such a joystick is connected to the implement by means of Bowden cables and the mechanical effort for moving the implement is provided by the operator. In this way, the requirement for servo-motors and a control system is avoided.

Mounting mechanical joysticks on a vehicle seat presents difficulty because they are of necessity larger and bulkier than electronic joysticks and they would tend to inhibit access to the seat.

SUMMARY OF THE INVENTION

It is an object of the present invention to provide a vehicle, in particular a tractor, designed to eliminate the aforementioned drawbacks.

It is another object of this invention to mitigate the problem of seat access on a tractor when using a mechanical joystick.

According to the present invention, there is provided a vehicle seat for an operator in combination with a mechanical joystick for operating ancillary equipment of the vehicle, wherein the joystick is pivotably mounted on the seat for movement between an active position in which the joystick may be manipulated by a seated operator and a stowed position in which access to the seat is unencumbered by the joystick.

By pivotably mounting the joystick on the seat, the invention enables it to be conveniently stowed away when not in use or when the operator is entering the vehicle.

It is common in a mechanical joystick to provide a control button for locking the joystick in position to prevent accidental movement of the implement controlled by the joystick. In a preferred embodiment of the invention, the joystick is provided with such a control button for enabling and disabling operation of the joystick and the control button is mechanically coupled to the seat in such a manner that the joystick is automatically disabled when the joystick is in the stowed position. This may conveniently be achieved by coupling the control button to the seat by means of a Bowden cable.

Advantageously, each of the Bowden cables connecting the joystick to the controlled implement includes slack to permit the seat and the joystick to move freely. To prevent the cables, especially when not taut, from presenting an obstacle or a hazard, means may be provided for constraining the slack sections of the Bowden cables. For example, the slack may be coiled or looped and guided in the vehicle cab in such a manner as to stack away safely and neatly.

In the preferred embodiment of the invention, the joystick is mounted on the seat by means of a bracket having two arms at an angle to one another, the first arm being pivotable at its free end relative to the seat and the second arm supporting the joystick at its free end. If the first arm is pivotably mounted to the seat at a point higher than the base of the seat and the second arm, when in the active position, lies below and extends parallel to the top surface of the base of the seat, then as the bracket is pivoted towards the stowed position, the joystick moves towards the seat back at the same time as it is being lowered.

If the seat is provided with an arm rest, then the first arm of the bracket is most conveniently pivoted at a point that is just below the arm rest.

It is desirable to be able to lock the bracket in any position and this may be achieved by providing an arcuate slot in the bracket to receive a locking bolt that engages in the base of the seat.

It is advantageous in a mechanical joystick to provide as long a control rod as possible in order to reduce the force that must be exerted by the operator when controlling the implement. To permit the use of a long control rod while without interfering with the stowing away of the joystick, it is preferred for the joystick to comprise a telescopically extendable control rod.

These and other objects, features and advantages are accomplished according to the instant invention by providing a vehicle seat for an operator is disclosed in combination with a mechanical joystick for operating ancillary equipment of the vehicle. The joystick is pivotably mounted on the seat for movement between an active position in which the joystick may be manipulated by a seated operator and a stowed position in which access to the seat is unencumbered by the joystick.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
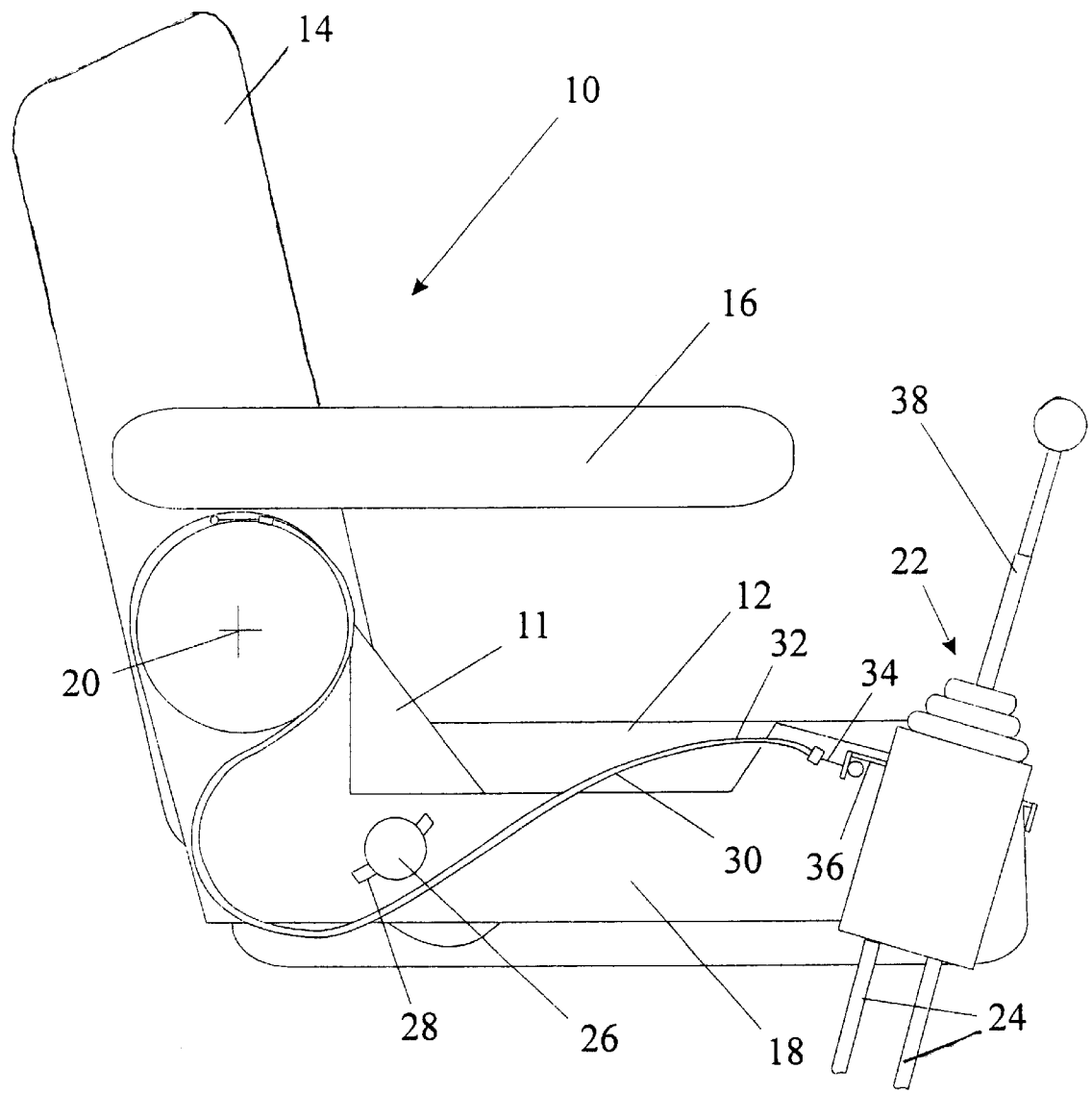
FIG. 1 is a side view of a combined seat and mechanical joystick in its active position.

FIG. 1 shows a side view of a tractor seat 10 incorporating a retractable joystick. The seat 10 is of conventional design having a metal frame 11 connected to a base 12 and a back support 14. The back support 14 may be pivotally attached to an armrest 16 extending forward from the side of the back support 14 parallel to the seat base 12.

The upper end of the shorter limb of an L-shaped bracket 18 is attached at a pivot 20 to the seat frame 11 and its longer limb extends forward, generally parallel to the seat base 12 for supporting a joystick control 22, which is connected to an implement (not shown) by means of a pair of cables 24. The pivot 20 is located just lower down the back support 14 from the pivot of the armrest 16.

The joystick control 22 extends generally upwards from front end of the longer limb of the bracket 18 to be conveniently accessible to an operator sitting in the seat 10 with his arm resting on the armrest 16. If desired, the joystick 38 may itself be telescopically collapsible to make it more readily accessible.

In the operational raised position shown in FIG. 1, the joystick control 22 hinders access to the seat and if arranged on the door side of the seat would inhibit the driver from entering and leaving the cabin. To avoid this problem, the joystick control 22 can be swung downwards on its L-shaped support bracket 18, about the pivot 20 into a stowed position shown in FIG. 2.

A locking bolt 26 screwed into the seat frame 11 is provided to lock the bracket 18 at any point between the extremes of its travel. The bolt 26 passes through an arcuate slot 28 (centred on the pivot 20) to enable bracket 18 to slide between the locking bolt 26 and the seat frame 11.

The cables 24 connected to the joystick control 22 are routed in such a way as to ensure that they do not interfere with the swinging of the bracket 18 into its stowed position. This may be achieved by incorporating slack or a coil into the cables 24. A cable tidy may be used to constrain the slack in the Bowden cables for neatness and safety.

Figure 2:
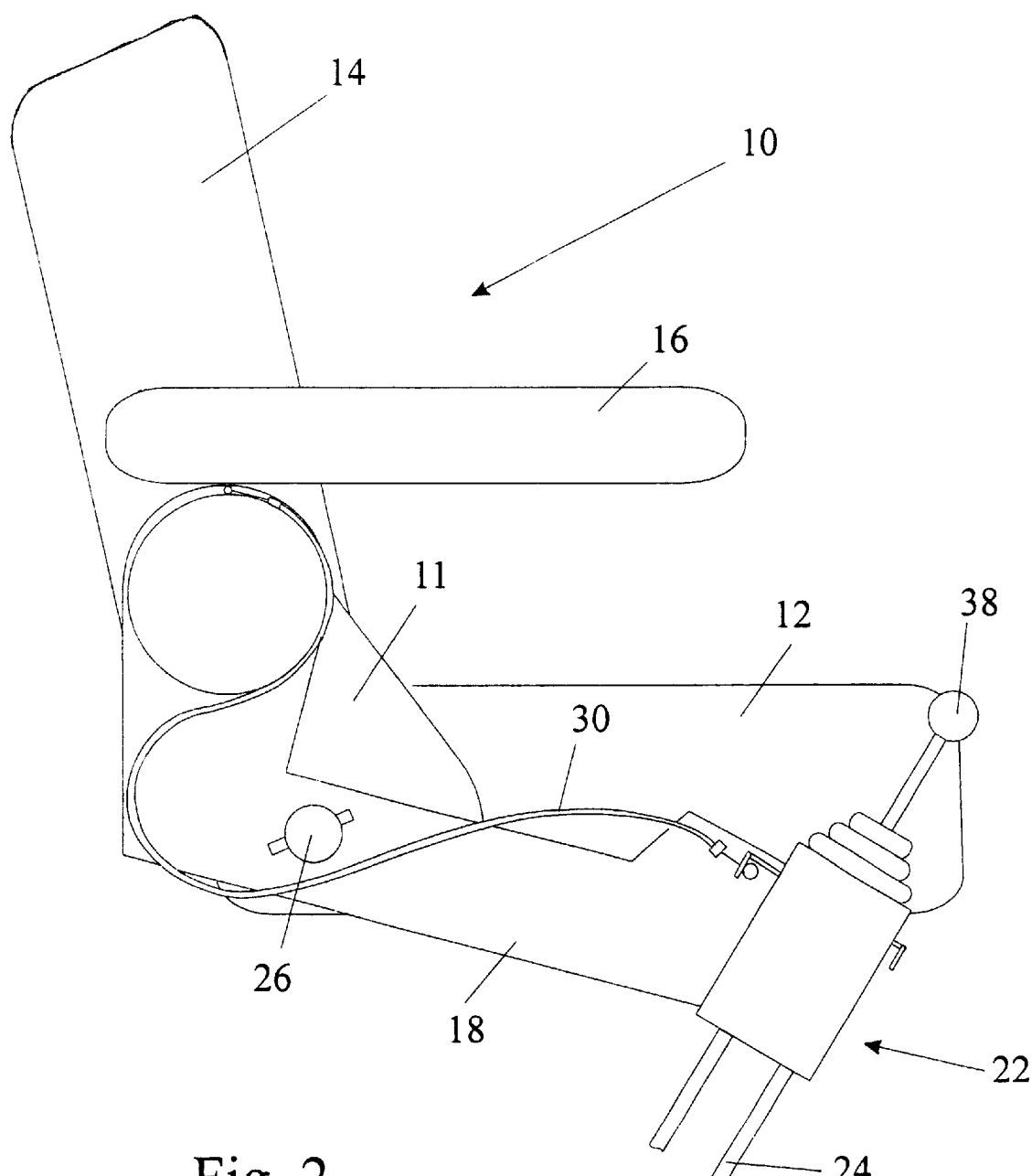
FIG. 2 is a side view of the combined seat and mechanical joystick in its stowed position.

FIGS. 1 and 2 also show provision for automatic locking of the joystick control when in the stowed position. This is achieved by means of a Bowden cable 30 consisting of an outer sleeve 32 and an inner core 34. The joystick control has a control button 36 which when pulled out prevents the joystick 38 from being moved relative to the control housing. One end of the inner core 34 is attached to the control button 36 and its other end is secured to the seat frame 11. Both ends of the outer sleeve 32 are secured to the bracket 18 in such a way that when the bracket 18 is rotated toward the stowed position the cable core 34 slides within the sleeve 32 pulling the joystick lock into the locked position, and releasing it on return to the operating position (FIG. 1).

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A vehicle seat for an operator in combination with a mechanical joystick adapted to operate an ancillary equipment of a vehicle, wherein the joystick comprises an operating handle connected to a telescopically extendable control rod and is pivotably mounted on the seat for movement between an active position in which the joystick may be manipulated by a seated operator and a stowed position in which said handle and control rod do not physically interfere with access to the seat by an operator.

2. The vehicle seat of claim 1 wherein the joystick has a control button for enabling and disabling operation of the joystick and wherein the control button is mechanically coupled to the seat in such a manner that the joystick is automatically disabled when in the stowed position.

3. The vehicle seat of claim 2 wherein the control button is coupled to the seat by means of a Bowden cable.

4. The vehicle seat of claim 1 wherein the joystick acts in use on the ancillary equipment by way of Bowden cables, each of said Bowden cables including slack to permit movement of the seat and of the joystick without affecting the operation of the ancillary equipment.

5. The vehicle seat of claim 4 further comprising means for constraining the slack sections of the Bowden cables.

6. The vehicle seat of claim 1 wherein the joystick is mounted on the seat by means of a bracket having first and second arms at an angle to one another, the first arm being pivotable at its free end relative to the seat and the second arm supporting the joystick at its free end.

7. The vehicle seat of claim 6 wherein said seat includes a seat base, said first arm being pivotably mounted to the seat at a point higher than the seat base, said second arm, when in the active position, being positioned below said seat base and extending parallel to a top surface of said seat base.

8. The vehicle seat of claim 7 wherein the seat is provided with an arm rest, said first arm of the bracket being pivoted at a point that is lower than the arm rest.

9. The vehicle seat of claim 8 wherein the bracket is formed with an arcuate slot which receives a locking bolt that engages in the seat base, to enable the bracket to be locked in any desired position.

10. A vehicle seat for an operator in combination with a mechanical joystick adapted to operate an ancillary equipment, wherein the joystick is pivotably mounted on the seat by means of a bracket having first and second arms at an angle to one another, said first arm being pivotable at its free end relative to the seat at a point that is lower than said arm rest and the second arm supporting the joystick at its free end for movement between an active position in which the joystick may be manipulated by a seated operator and a stowed position in which access to the seat is unencumbered by the joystick:

said seat including a seat base and an arm rest, said first arm being pivotably mounted to the seat at a point higher than the seat base, said second arm, when in the active position, being positioned below said seat base and extending parallel to a top surface of said seat base; and said bracket formed with an arcuate slot that receives a locking bolt that engages in the seat base, to enable the bracket to be locked in any desired position.

11. A vehicle seat for an operator in combination with a mechanical joystick comprising an operating handle connected to a telescopically extendable control rod adapted to operate an ancillary equipment, wherein the joystick is pivotably mounted on the seat by means of a bracket having first and second arms at an angle to one another, said first arm being pivotable at its free end relative to the seat at a point that is lower than said arm rest and the second arm supporting the joystick at its free end for movement between an active position in which the joystick may be manipulated by a seated operator and a stowed position in which access to the seat is unencumbered by the joystick; and said seat including a seat base and an arm rest, said first arm being pivotably mounted to the seat at a point higher than the seat base, said second arm, when in the active position, being positioned below said seat base and extending parallel to a top surface of said seat base.

* * * * *